United States Patent Office 2,789,944
Patented Apr. 23, 1957

2,789,944
PURIFICATION OF WATER-SOLUBLE SULFONATED RESINS

Harold H. Roth, Bay City, Mich., assignor to The Dow Chemical Company, Midland, Mich., a corporation of Delaware No Drawing. Application June 28, 1952,
Serial No. 296,240

2 Claims. (Cl. 210—37)

This invention concerns a method for removing ionizable inorganic impurities from certain water-soluble sulfonated resins. It pertains especially to the removal, from water-soluble sulfonated alkenyl aromatic resins, of ionizable inorganic impurities, particularly sulfuric acid or salts thereof, which are incident to manufacture of the sulfonated resins.

The water-soluble sulfonated resins with which the invention is concerned are derivatives of alkenyl aromatic resins having average molecular weights, as determined by the Staudinger viscosity method, of 1000 or higher and containing in chemically combined form, at least 50 percent by weight of one or more alkenyl aromatic compounds having the general formula:

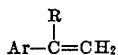

wherein Ar represents a monovalent aromatic hydrocarbon radical and R is hydrogen or the methyl radical. A considerable number and variety of the alkenyl aromatic resins are known. Examples of alkenyl aromatic resins which may be employed in making the sulfonated resins to be purified by the method of the invention are the homopolymers of styrene, alpha-methylstyrene, ar-vinyltoluene, ar-methyl-alpha-methylstyrene, and ar-isopropylstyrene; copolymers of any two or more of such alkenyl aromatic compounds with one another, e. g. copolymers of styrene and alpha-methylstyrene or of ar-vinyltoluene and alpha-methylstyrene; and copolymers of a major amount by weight of one or more of the above-mentioned alkenyl aromatic compounds with minor amounts of other polymerizable mono-olefinic compounds such as butenes or pentenes; etc.

It is known that the alkenyl aromatic resins, e. g. polystyrene, may be sulfonated by reaction with usual sulfonating agents such as concentrated sulfuric acid, fuming sulfuric acid, chlorosulfonic acid, sulfur trioxide, or complexes of sulfur trioxide with dioxane or beta, beta'-dichlorodiethyl ether. Ways are also known for carrying out the sulfonation so as to obtain water-soluble sulfonated alkenyl aromatic resins that are useful, either in their acidic form or as salts thereof, as sizing materials, or as agents for thickening aqueous liquids, etc. However, the sulfonation reaction results in formation of a crude product comprising the water-soluble sulfonated alkenyl aromatic resin admixed with ionizable inorganic impurities such as the unconsumed sulfonating agent, sulfuric acid, and frequently other compounds such as hydrochloric acid, sodium sulfate, or sodium chloride, etc. When the crude sulfonated resin is neutralized, e. g. with ammonium hydroxide, sodium hydroxide, potassium hydroxide, or a corresponding carbonate, to form a water-soluble salt of the same, the sulfuric acid or other acidic impurities are converted to inorganic salts which are soluble in water. Since both the sulfonated resin and inorganic impurities accompanying the same are water-soluble, purification of the sulfonated resin has heretofore been troublesome. It is important that the ionizable inorganic compounds be removed not only for purpose of obtaining sulfonated resins of good and reproducible purity, but also because the effectiveness of the sulfonated resins in thickening, i. e. increasing the viscosity of, aqueous liquids is reduced by the presence of such impurities.

It is an object of this invention to provide a simple, convenient method for removing ionizable inorganic impurities from the water-soluble sulfonated alkenyl aromatic resins.

I have found that the water-soluble sulfonated alkenyl aromatic resins, although highly ionized in an aqueous solution thereof, are not absorbed to appreciable extent by, or appreciably reactive with, water-insoluble granular ion exchange resins such as are suitable for use in usual water-softening or water-demineralization operations. The ion exchange resins suitable for such purposes, and which are referred to herein, are ones which become swollen to not more than three times their initial volume on being converted from a dry condition to a water-wetted condition.

For instance, an aqueous solution of polystyrene sulfonic acid (a strong acid) can be passed through a bed containing more than twice the amount of a strongly basic anion exchange agent theoretically required to neutralize the polystyrene sulfonic acid and nearly all of the polystyrene sulfonic acid be obtained unreacted in the effluent liquid. Apparently, the molecule of the resin sulfonic acid is too large to be absorbed by an anion exchange resin and this prevents it from reacting with any, except possibly the exposed outer surfaces, of the anion exchange resin granules. When using anion exchange resin granules of usual commercial sizes, e. g. of 100 mesh size or larger as determined with Tyler screens, the amount of the polystyrene sulfonic acid which reacts with outer surfaces of the resin granules is very small and inconsequential. Similarly, an aqueous solution of polystyrene sulfonic acid can be passed through a bed of the acidic form of a cation exchange resin and nearly all of the polystyrene sulfonic acid be obtained in the effluent liquid. Also, an aqueous solution of a given salt, e. g. the sodium salt, of polystyrene sulfonic acid can be passed through a bed of the corresponding salt of a cation exchange resin and nearly all of the salt of the polystyrene sulfonic acid be obtained in the effluent liquor. However, upon passing the ammonium salt of polystyrene sulfonic acid through a bed of the sodium salt of a cation exchange resin, a cation exchange reaction takes place with a result that sodium polystyrene sulfonate is obtained in the effluent liquor. Similarly, sodium polystyrene sulfonate can be reacted with the potassium salt of a cation exchange resin to obtain potassium polystyrene sulfonate in the effluent liquor. In all such instances, little if any of the soluble sulfonated alkenyl aromatic resin is absorbed by the insoluble ion exchange resin.

In contrast, the water-soluble, ionizable, inorganic impurities incident to manufacture of the water-soluble sulfonated alkenyl aromatic resins are readily reacted with, and chemically absorbed by, ion exchange resins and thus removed from a solution of a sulfonated alkenyl aromatic resin.

The method comprises treating a solution of an impure sulfonated alkenyl aromatic resin in an ionizing solvent, e. g. water or aqueous alcohol, with a basic form of an anion exchange resin so as to obtain chemical absorption by the anion exchange resin, and removal from the solution, of the anions of inorganic impurities. When the impurities to be removed are strong acids, e. g. sulfuric acid or a mixture of sulfuric and hydrochloric acids, any of the usual anion exchange resins can satisfactorily be used. When the impurities are inorganic salts such as sodium sulfate or sodium chloride, strongly basic anion exchange resins, preferably anion exchange resins containing quaternary ammonium radicals, are advantageously used. A variety of anion exchange resins suitable for use in the process of the invention are known. Examples of such anion exchange resins are the resinous condensation products of phenol, formaldehyde and polyethylenepolyamines; and the products obtained by reacting amines such as trimethylamine, dimethylethanolamine, or diethylenetriamine with a chloromethylated copolymer of a major amount of styrene and minor amounts of ar-ethylvinylbenzene and divinylbenzene; etc.

The treatment of a solution of an impure sulfonated alkenyl aromatic resin with a granular anion exchange resin in its basic form can be carried out either by stirring the solution together with sufficient of the anion exchange resin to react with the inorganic impurities and then removing the anion exchange resin, e. g. by filtering or decanting, or by passing the solution of the impure sulfonated alkenyl aromatic resin through a bed of the granular anion exchange resin. In either instance, the anion exchange resin, which is at least partially in its basic form, reacts to chemically absorb anions of inorganic impurities, leaving the water-soluble sulfonated alkenyl aromatic resin dissolved in the surrounding liquid. The treatment is usually carried out at room temperature or thereabout, but it can be accomplished at lower or higher temperatures, e. g. at temperatures of from the freezing point of the sulfonated alkenyl aromatic resin solution to about 100° C.

A water-soluble alkenyl aromatic resin sulfonic acid which contains one or more inorganic acids, e. g. sulfuric acid or both sulfuric and hydrochloric acids, as impurities can satisfactorily be purified by the above-described treatment of a solution of the impure alkenyl aromatic resin sulfonic acid with an anion exchange resin which is at least partially in its basic form. Thus, the mixture of water-soluble polystyrene sulfonic acid with sulfuric acid, or with sulfuric and hydrochloric acids, which is obtainable by sulfonating polystyrene in known manner, may be dissolved in water and the solution be passed through a bed of any of the aforementioned anion exchange resins in basic form, to cause chemical absorption of the inorganic acids by the anion exchange resin leaving the purified alkenyl aromatic resin sulfonic acid dissolved in the liquid. In some instances, two or more passes of the solution through the bed of anion exchange resin are necessary in order to obtain complete removal of the inorganic acids. Instead of passing the solution through a bed of anion exchange resin, the latter may be stirred together with the solution and thereafter be removed by filtering or decanting. After being used, the anion exchange resin can be regenerated in usual ways, e. g. by treatment with an aqueous alkali solution followed by a water wash, and thus be reconditioned for further employment in the process.

It may be mentioned that during the removal of inorganic impurities from a solution of a sulfonated alkenyl aromatic resin (either in its acidic or salt form) the viscosity of the solution frequently increases and further dilution may be desirable for convenience of operation. Such increase in viscosity is due to removal of the inorganic impurities. As hereinbefore mentioned, ionizable inorganic impurites such as mineral acids or salts have an effect of reducing greatly the extent to which the sulfonated alkenyl aromatic resins thicken water. This is one of the reasons why it is important that such impurities be removed. The removal of the impurities permits the water-soluble sulfonated resin to exert its normal action of thickening aqueous solutions and results in the increase in viscosity. The water-soluble sulfonated alkenyl aromatic resins, e. g. the various water-soluble sulfonated polystyrenes, vary as regards their effectiveness in thickening water. When the water-soluble sulfonated resin is one having little, or no, thickening effect to increase the viscosity of water, the removal of inorganic impurities from a solution thereof does not cause appreciable increase in the viscosity of the solution. In most instances, the soluble sulfonated resins thicken water and removal of the impurities results in an increase in viscosity.

The above-described treatment of a solution of a water-soluble sulfonated alkenyl aromatic resin with a granular anion exchange agent is effective in removing from the solution the anions of inorganic impurities, regardless of whether the water-soluble sulfonated resin is in its acidic form or is present in salt form, e. g. as its ammonium, sodium or potassium salt. In both instances, the water-soluble sulfonated resin (whether in acid form or present as its salt) remains substantially unreacted and dissolved in the liquid. When the sulfonated resin which is to be purified is an alkenyl aromatic resin sulfonic acid and the inorganic impurity consists of one or more mineral acids, e. g. sulfuric acid alone or together with hydrochloric acid, the treatment with the basic anion exchange resin is sufficient to remove the impurities. The solution of the alkenyl aromatic resin sulfonic acid which remains after the treatment may be evaporated to obtain the resin sulfonic acid in a form of high purity, or it may be neutralized, e. g. with NH₃, NaOH, or KOH, to obtain a salt of the purified resin sulfonic acid.

When the water-soluble sulfonated resin which is to be purified is initially in salt form and contains one or more inorganic salts such as sodium sulfate or sodium chloride as impurities, it is necessary that the above-described treatment of a solution of the sulfonated resin with a basic anion exchange resin be preceded or followed by treatment of the solution with a granular cation exchange agent which is at least partially in its acidic form, i. e. which comprises sufficient of the acidic cation exchange agent to react with and absorb the cations of the inorganic impurities. The cation exchange agent may be, and usually is, partially in salt form. Although any cation exchange resin can be used in the process of the invention, those containing sulfonate radicals are preferred. A variety of suitable cation exchange resins are known. Examples of such cation exchange resins are sulfonated phenol-formaldehyde condensation products and the sulfonated copolymers of monovinyl aromatic compounds and polyvinyl aromatic compounds which are described in U. S. Patent 2,366,007.

As indicated above, the treatment of a solution of a water-soluble sulfonated alkenyl aromatic resin to remove dissolved inorganic salts therefrom requires employment both of an anion exchange resin in its basic form and a cation exchange resin in its acidic form. Either or both of the ion exchange resins may be partially in salt form. The treatment of the solution with either of the ion exchange resins may precede treatment of the solution with the other ion exchange resin, or the solution may be treated directly with a mixture of the two ion exchange resins. Regardless of which of these procedures be followed, it is important that the ion exchange material with which the solution is contacted contain an ion exchange agent capable of chemically absorbing either the cations or the anions of the inorganic salt impurities and thereby splitting such salts.

In an instance in which the solution is successively contacted with the two kinds of ion exchange agents, it is important that the first of the ion exchange agents with which the solution is contacted have such property of splitting the inorganic salt impurities. For instance, when the solution of the impure resin sulfonate is passed first through a bed of anion exchange material and then through a bed of cation exchange material the anion exchange material should initially contain sufficient of a strongly basic anion exchange material, preferably of an ion exchange resin containing quaternary ammonium hydroxide radicals, to chemically absorb anions of the inorganic salt impurities, thereby rendering the solution basic. Any cation exchange agent in its acidic form, e. g. the acidic form either of an insoluble sulfonated resin or of an insoluble carboxylated resin such as a copolymer of maleic anhydride, styrene and divinylbenzene, can be used to chemically absorb the cations of the base, thus neutralizing the solution of the resin sulfonate and furthering the purification of the latter. Similarly, when the solution of the impure resin sulfonate is to be passed first through a bed of a cation exchange resin and then through a bed of an anion exchange resin, it is important that the cation exchange material comprise sufficient of a strongly acidic cation exchange resin, e. g. an insoluble resin sulfonic acid, to chemically absorb cations of the inorganic salt impurities and remove them from the solution, thus rendering the solution acidic. Any anion exchange resin in its basic form can be used to neutralize the resulting acidic solution by chemically absorbing anions therefrom. When a solution of a water-soluble resin sulfonate is to be freed of dissolved inorganic salt impurities by contact with a mixture of a cation exchange resin which is at least partially in its acidic form and an anion exchange resin which is at least partially in its basic form, it is necessary that at least one of the ion exchange materials be strongly enough ionized to split the inorganic salt impurities by chemically absorbing ions of the same. The other of the ion exchange materials in such mixture may, but need not, be strongly ionized. Thus, such mixture of ion exchange agents may comprise a strongly basic anion exchange resin containing quaternary ammonium hydroxide radicals and an acidic form of any cation exchange resin, or it may comprise a strongly acidic cation exchange resin containing sulfonic acid radicals and the basic form of any anion exchange resin. After being used, both the anion exchange resin and the cation exchange resin may be regenerated in known ways.

When a water-soluble salt, e. g. the sodium or potassium salt, of a sulfonated alkenyl aromatic resin is to be freed of inorganic salt impurities while retaining the sulfonated resin as a salt, it is desirable that the acidic form of the cation exchange resin be employed in amount corresponding approximately to that required for removal of the cations of the inorganic salt impurities. In such instance, the cation exchange resin usually comprises a major amount of the same in salt form and a minor amount of it in its acidic form. Alternatively, the acidic cation exchange resin may be used in amount greater than is required for chemical absorption of the cations of the inorganic salt impurities (in which case at least a portion of the water-soluble resin sulfonate is converted to its acidic form) and the purified solution of the resin sulfonate be neutralized with alkali to reconvert the soluble resin sulfonic acid into a salt of the same.

By employing a major portion of the cation exchange agent as a salt thereof containing metal ions of the kind desired in the purified water-soluble resin sulfonate, other kinds of metal ions initially present in the impure soluble resin sulfonate are absorbed by the cation exchange resin and replaced with the desired metal ions. Thus, a mixture of the sodium and potassium salts of polystyrene sulfonic acid together with minor amounts of sodium sulfate and potassium sulfate as impurities can be purified and converted entirely to the sodium polystyrene sulfonate by contacting an aqueous solution thereof with an anion exchange resin in its basic form and a cation exchange resin which is partially in its acidic form, but principally in the form of a sodium salt thereof, and separating the solution from the ion exchange materials. If desired, an aqueous solution of an ammonium salt of sulfonated polystyrene containing ammonium sulfate as an impurity can be passed through one or more beds comprising an anion exchange resin in its basic form and a cation exchange resin which is partially in its acidic form, but principally in the form of a sodium salt thereof, to obtain, as the effluent liquid, an aqueous solution of sodium polystyrene sulfonate in a form of high purity.

As hereinbefore indicated, in the sulfonation of an alkenyl aromatic resin with usual sulfonating agents to form a water-soluble resin sulfonic acid, the latter is obtained in a form containing inorganic acid-acting impurities. The crude acidic product thus obtained is preferably purified in accordance with the invention, since its purification merely involves contact of a solution thereof with a basic form of an anion exchange resin and separation of the treated solution from the anion exchange resin. The purified alkenyl aromatic resin sulfonic acid thus obtained may be neutralized with an alkali such as ammonia, sodium hydroxide or potassium hydroxide to obtain a salt of the resin sulfonic acid. However, there are instances in which the crude water-soluble alkenyl aromatic resin sulfonic acid comprises inorganic salts as impurities, or in which it is desired to neutralize the crude product and convert it and the inorganic acid impurities into salts prior to purifying the same. In such instance, the process as hereinbefore described preferably uses both a basic form of an anion exchange resin and an acidic form of a cation exchange resin together, if desired, with salts of one or both of the ion exchange materials. Because of the lesser number of steps and materials involved, a crude water-soluble sulfonated alkenyl aromatic resin is preferably purified while in its initial acidic form, i. e. in the form of the resin sulfonic acid.

The following examples describe a number of ways in which the invention has been practiced, but are not to be construed as limiting its scope.

*Example 1*

This example describes a test of the invention to determine the effectiveness of ion exchange resins in removing a known inorganic impurity from a solution of sodium polystyrene sulfonate. In 100 ml. of water there was dissolved 0.7 gram of substantially pure polystyrene sulfonic acid. The solution was neutralized by titration with a 1-normal aqueous sodium hydroxide solution. The resulting solution of sodium polystyrene sulfonate had a viscosity of 1380 centipoises at 25° C. One gram of anhydrous sodium sulfate was added and dissolved in the solution. The solution then had a viscosity of only 170 centipoises at 25° C., i. e. the addition of the salt caused a pronounced decrease in viscosity. To the solution there were added 20 ml. of granular Dowex-50 (a sulfonated copolymer of a major amount by weight of styrene and minor amounts of ar-ethylvinylbenzene and divinylbenzene) in its acidic, i. e. hydrogen ion, form and 30 ml. of granular Dowex-2 (an anion exchange resin obtained by reacting dimethyl ethanolamine with a chloromethylated copolymer of a major amount of styrene and minor amounts of ar-ethylvinylbenzene and divinylbenzene). Each of these ion exchange resins were in the form of water-swollen granules of from 20 to 80 mesh size as determined with Tyler screens. The mixture was stirred at room temperature for 30 minutes and then a portion of the liquid was removed and tested for viscosity. It had a viscosity of 1340 centipoises at 25° C. The remainder of the mixture was stirred for another 30 minutes, after which the liquid was separated and tested for viscosity. It had a viscosity of 1350 centipoises at 25° C. The fact that the treatment with the ion exchange resins caused an increase in viscosity of the sodium polystyrene sulfonate solution and produced a solution having a viscosity nearly as great as that initially possessed by the solution of pure sodium polystyrene sulfonate indicates that almost all of the sodium sulfate was removed from the solution and that very little, if any, of the polystyrene sulfonate had been removed from the solution.

Example 2

This example describes another test as to the removal of a known impurity from a solution of sodium polystyrene sulfonate. A solution of 0.5 gram of substantially pure polystyrene sulfonic acid in 100 ml. of water was neutralized by titration with a 1-normal aqueous sodium hydroxide solution. It was found that 1.8 ml. of the sodium hydroxide solution was required for the neutralization. The resulting aqueous sodium polystyrene sulfonate solution had a viscosity of 2,600 centipoises at 25° C. To the solution, there was added 0.2 gram of anhydrous sodium sulfate. The solution then had a viscosity of only 70 centipoises at 25° C. To the solution, there were added 15 ml. of Amberlite IRC-50(a) (water-insoluble styrene-acrylic acid copolymer) in its acidic form and 20 ml. of Dowex-2 in its basic form. Both ion exchange agents were added as water-swollen granules of from 20 to 80 mesh size. The mixture was stirred at room temperature for 30 minutes and filtered. The filtrate had a viscosity of 2,800 centipoises at 25° C.

Example 3

Crude polystyrene sulfonic acid which contained an average of about 0.7 sulfonic acid radical per benzene nucleus and which was accompanied by sulfuric acid as an impurity was dissolved in water to form a dilute, i. e. between 1 and 2 weight percent, solution of the same. A portion of the solution was tested to determine its acidity and its total sulfur content. It was found that the solution had an acidity corresponding to the presence of 0.0126 percent by weight of hydrogen ions capable of being neutralized with alkali and that the solution contained a total of 0.301 percent of chemically combined sulfur. From these values, it was calculated that the crude polystyrene sulfonic acid starting material was of about 82 weight percent purity, i. e. that it contained about 18 percent of sulfuric acid. A 100 ml. portion of the crude polystyrene sulfonic acid solution was passed twenty times through a bed of 20 ml. of Dowex-3 (an anion exchange resin obtained by reacting diethylene-triamine with a chloromethylated copolymer of a major amount by weight of styrene and minor amounts of ar-ethylvinylbenzene and divinylbenzene) in its basic form. The Dowex-3 was in the form of granules of from 20 to 80 Tyler mesh size. After the repeated passage of the solution through the bed of anion exchange resin, the solution was again tested for acidity and sulfur content. It was then found to have an acidity corresponding to the presence of 0.0077 weight percent of hydrogen ions capable of being neutralized with alkali and to contain 0.236 weight percent of chemically combined sulfur. From these values it was calculated that the polystyrene sulfonic acid in the treated solution was of about 97 purity, based on the combined weight of the same and the small amount of sulfuric acid remaining in the solution.

Example 4

To a reaction vessel which initially contained 200 ml. of carbon tetrachloride, there were simultaneously fed liquid chlorosulfonic acid at a rate of 1.67 ml. per minute and a solution of 138.6 grams of polystyrene in 1980 ml. of carbon tetrachloride at a rate of 33 ml. per minute. The mixture was stirred vigorously during feed of these materials. There was thus formed a slurry of crude granular polystyrene sulfonic acid in carbon tetrachloride. The product was separated by filtration and occluded carbon tetrachloride was vaporized therefrom. The crude dry polystyrene sulfonic acid contained acidic impurities, presumably unreacted chlorosulfonic acid or sulfuric and hydrochloric acids. Five grams of the crude product was dissolved in 100 ml. of water and the solution was filtered to remove solid impurities. It was found that 2.7 ml. of $\frac{1}{10}$-normal sodium hydroxide solution was required to neutralize a 1 ml. portion of the solution. The remainder of the solution was passed 6 times through a bed of 26 ml. of the basic form of Dowex-3 (described in Example 3). A 1 ml. portion of the solution then required only 1.9 ml. of $\frac{1}{10}$-normal sodium hydroxide solution to neutralize the same. The remainder of the solution was again passed 3 times through the bed. Only 1.85 ml. of the $\frac{1}{10}$-normal sodium hydroxide solution was then required to neutralize 1 ml. of the polystyrene sulfonic acid solution.

Example 5

One part by weight of crude polystyrene sulfonic acid which had been prepared by reacting sulfur trioxide with polystyrene and which contained acidic inorganic sulfur compounds, e. g. sulfuric acid, was dissolved in 199 parts of water to form a solution having a viscosity of 2,400 centipoises at 25° C. To a 60 ml. portion of the solution, 10 ml. of the basic form of Dowex-3 (described in Example 3) was added and the mixture stirred. In 10 minutes, the viscosity of the solution increased to a value of 18,000 centipoises at 25° C. This increase in viscosity is indicative that the inorganic acid impurities were effectively removed from the solution by selective reaction with the Dowex-3, but that the polystyrene sulfonic acid remained in the solution.

I claim:

1. A method of purifying a water-soluble alkenyl aromatic resin sulfonic acid which contains sulfuric acid as an impurity, which comprises forming an aqueous solution of the impure alkenyl aromatic resin sulfonic acid and contacting the solution with a basic anion exchange resin, whereupon the latter selectively reacts with and chemically absorbs the sulfuric acid leaving the alkenyl aromatic resin sulfonic acid in the solution.

2. A method, as claimed in claim 1, wherein the alkenyl aromatic resin sulfonic acid is polystyrene sulfonic acid.

References Cited in the file of this patent

UNITED STATES PATENTS

| 2,259,169 | Little | Oct. 14, 1941 |
| 2,570,822 | Kressman | Oct. 9, 1951 |
| 2,628,193 | D'Alelio | Feb. 10, 1953 |
| 2,632,001 | McMaster et al. | Mar. 12, 1953 |
| 2,640,756 | Wills | June 2, 1953 |
| 2,646,171 | Weiss | July 21, 1953 |
| 2,667,417 | Delmousee et al. | Jan. 26, 1954 |
| 2,697,724 | Collier | Dec. 21, 1954 |
| 2,697,725 | Bryce | Dec. 21, 1954 |

OTHER REFERENCES

Ind. & Eng. Chem., vol. 33, No. 10, Oct. 1941, pps. 1270–1275.

Ind. & Eng. Chem., vol. 35, No. 8, Aug. 1943, pps. 859–863.